(12) United States Patent
Kim et al.

(10) Patent No.: US 8,593,927 B2
(45) Date of Patent: *Nov. 26, 2013

(54) METHOD OF READING OPTICAL INFORMATION AND METHOD OF RECORDING OPTICAL INFORMATION

(75) Inventors: Nak Young Kim, Seoul (KR); Pil Sang Yoon, Seoul (KR); Kyu Il Jung, Seoul (KR)

(73) Assignee: Maple Vision Technologies Inc., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/562,008

(22) Filed: Jul. 30, 2012

(65) Prior Publication Data

US 2013/0028066 A1    Jan. 31, 2013

Related U.S. Application Data

(63) Continuation of application No. 12/344,966, filed on Dec. 29, 2008, now Pat. No. 8,233,369.

(30) Foreign Application Priority Data

Dec. 27, 2007   (KR) .................... 10-2007-0139324

(51) Int. Cl.
    *G11B 7/00*   (2006.01)
(52) U.S. Cl.
    USPC ..................... 369/103; 369/112.1

(58) Field of Classification Search
    None
    See application file for complete search history.

(56) References Cited

U.S. PATENT DOCUMENTS

| 8,233,369 B2 * | 7/2012 | Kim et al. ............ 369/103 |
| 2007/0236765 A1 | 10/2007 | Jung |
| 2007/0237050 A1 * | 10/2007 | Roh et al. ............ 369/100 |

\* cited by examiner

*Primary Examiner* — Adam R Giesy
*Assistant Examiner* — Carl Adams
(74) *Attorney, Agent, or Firm* — Venable LLP; Robert S. Babayi; Thomas A. Negley

(57) ABSTRACT

In a method of recording and reading optical information in a recording medium using holography, a first recording operation is performed for recording optical information in a first recording region in an overlapping manner by allowing a reference beam and a signal beam with data loaded to interfere with each other in the first recording region, the reference beam being angularly multiplexed at predetermined intervals. Furthermore, a second recording operation is performed for recording optical information in a second recording region adjacent to the first recording region in an overlapping manner by allowing the reference beam and the signal beam to interfere with each other in the second recording region, the reference beam being angularly multiplexed between the predetermined intervals. Consequently, optical information can be recorded so as to easily detect and determine a selected reproducing beam, thus increasing the reading efficiency of the optical information.

7 Claims, 4 Drawing Sheets

METHOD OF READING OPTICAL INFORMATION AND METHOD OF RECORDING OPTICAL INFORMATION

CROSS-REFERENCE TO RELATED APPLICATION

This application is a Continuation of U.S. patent application Ser. No. 12/344,966,, filed Dec. 29, 2008, which claims the benefit of Korean Patent Application No. 10-2007-0139324, filed Dec. 27, 2007, the disclosure of which is hereby incorporated herein by reference in its entirety.

BACKGROUND OF THE INVENTION

1. Field of the Invention

The present invention relates to a method of reading optical information and a method of recording optical information, and more particularly, to methods of reading and recording optical information in a recording medium using holography.

2. Description of the Related Art

Recently, as information and computer industries are rapidly being developed, there is an increasing demand for storage devices that can satisfy requirements for mass storage capability and high-speed data input/output. Therefore, a compact disc (CD), a digital versatile disc (DVD), a high definition DVD (HD DVD), a blue-ray disc (BD), a holographic digital data storage (HDDS), and the like are in the limelight as optical information storage devices capable of storing massive data and inputting/outputting data at a high speed.

Among various storage devices, a device of processing optical information using a holographic digital information storage, which will hereinafter be referred to as 'optical information processing device', records optical information using interference fringes formed by splitting a beam emitted from a light source into a reference beam and signal beam, and then allowing the reference beam and the signal beam to interfere with each other at a recording medium made of a refractive material such as a photopolymer. To read optical information, the reference beam input during the recording of the optical information should be restored and irradiated to the interference fringes of the recording medium. Thus, a reproducing beam generated by the diffraction at the interference fringe is detected, and the optical information is then acquired from this reproducing beam.

Meanwhile, the optical information processing device may use various kinds of multiplexing methods to increase the recording capacity.

Examples of the multiplexing method may include an angular multiplexing method, a phase-code multiplexing method, a wavelength multiplexing method, a shift multiplexing method, a peristrophic multiplexing method, a correlation multiplexing method, a fractal multiplexing method, and so forth.

In line with the development of multiplexing methods as described above, it is necessary to develop a method of efficiently detecting and determining a reproducing beam intended to be reproduced among reproducing beams generated from recording regions where several bits of optical information are recorded in an overlapping manner.

The present invention provides a method of recording optical information and a method of reading optical information that can easily detect and determine a selected reproducing beam intended to be reproduced.

SUMMARY OF THE INVENTION

According to an aspect of the present invention, a method of recording optical information includes: performing a first recording operation for recording optical information in a first recording region in an overlapping manner by allowing a reference beam and a signal beam with data loaded to interfere with each other in the first recording region, the reference beam being angularly multiplexed at predetermined intervals; and performing a second recording operation for recording optical information in a second recording region adjacent to the first recording region in an overlapping manner by allowing the reference beam and the signal beam to interfere with each other in the second recording region, the reference beam being angularly multiplexed between the predetermined intervals.

According to another aspect of the present invention, a method of reading optical information includes: performing a first reference beam irradiation operation for irradiating a reference beam at a first multiplexing angle to a first recording region between the first recording region and a second recording region adjacent to the first recording region, wherein optical information is recorded in the first recording region by the reference beam that is angularly multiplexed at predetermined angles, and recorded in the second recording region by the reference beam that is angularly multiplexed between the predetermined angles; and performing a first optical detection operation for detecting a first reproducing beam generated from the first recording region.

In a method of processing optical information according to the present invention, optical information can be recorded so as to easily detect and determine a selected reproducing beam, which makes it possible to increase the reading efficiency of optical information.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, an optical information processing device according to the present invention will not be fully described with reference to the accompanying drawings.

Figure 1:
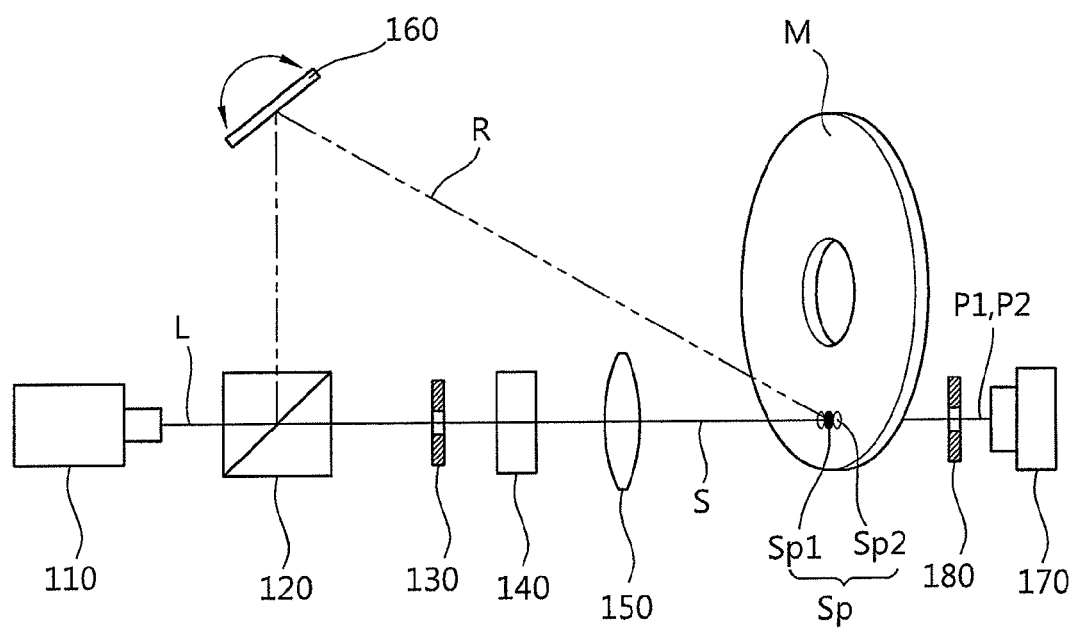
FIG. 1 is a schematic view of an optical information processing device according to an embodiment of the present invention.

FIG. 1 is a schematic view of an optical information processing device according to an embodiment of the present invention. Referring to FIG. 1, an optical information processing device includes a light source 110, a beam splitter 120, an optical modulator 140, an angle multiplexer 160, and an optical detector 170.

The beam splitter 120 is arranged on an optical path of a beam L emitted from the light source 110, and splits the beam L into a reference beam R and a signal beam S. The beam splitter 120 may include a polarized beam splitter configured to transmit a portion of the beam L and reflect the other portion of the beam L depending on the polarization of the beam L. The beam L transmitted through the beam splitter 120 may be used as the signal beam S, and the beam L reflected by the beam splitter 120 may be used as the reference beam R.

Here, a shutter 130 may be provided between the beam splitter 120 and the optical modulator 140. The shutter 130 controls the progression of the signal beam S. That is, the shutter 130 is opened during the recording of optical information to thereby allow the signal beam S to be incident on the optical modulator 140, whereas the shutter 130 is closed during the reading of optical information to prevent the progression of the signal beam S.

The optical modulator 140 is arranged on an optical path of the signal beam S passing through the shutter 130, and loads data onto the signal beam S. The optical modulator 140 may employ a spatial light modulator including a plurality of pixels in order to modulate data into a data page image and load the data page image onto the signal beam S. The spatial light modulator may include a transmissive spatial light modulator such as a twisted nematic liquid crystal (TN-LC), a super twisted nematic liquid crystal (STN-LC), and a thin film transistor liquid crystal (TFT-LC).

An objective lens 150 may be arranged on an optical path of the signal beam S onto which data is loaded by the optical modulator 140. The objective lens 150 condenses the signal beam S onto a recording medium M.

The angle multiplexer 160 is arranged on an optical path of the reference beam R, and adjusts an angle of the reference beam R incident on the recording medium M. The angle multiplexer 160 adjusts the angle of the reference beam R incident on the recording medium M to thereby multiplex the angle of the reference beam R, thus making it possible to record several bits of optical information within a single recording region Sp in an overlapping manner. The angle multiplexer 160 may include a rotating mirror, for example, a Galvano mirror.

The optical detector 170 is arranged on optical paths of reproducing beams P1 and P2 generated by irradiating the reference beam R onto the recording region Sp of the recording medium M, and detects the reproducing beams P1 and P2. The optical detector 170 may include one of a charge coupled device (CCD) and a complementary metal-oxide semiconductor (CMOS) with low power consumption.

An optical filter 180 may be provided between the recording medium M and the optical detector 170. When the reference beam R is incident on a recording region Sp1 that is intended to be reproduced (hereinafter, referred to as 'selected recording region'), the optical filter 180 transmits the reproducing beam P1 generated from the selected recording region Sp1, and blocks the adjacent reproducing beam P2 that may be generated together with the reproducing beam P1 from a recording region Sp2 adjacent to (or partially overlapped with) the selected recording region Sp1 (hereinafter, referred to as 'adjacent recording region'). The optical filter 180 may include a polytopic filter.

For convenience in description and understanding, it is assumed that the selected recording region Sp is a first recording region, and the selected reproducing beam P1 is a first reproducing beam, and like reference numerals are given to both of them. Likewise, it is assumed that the adjacent recording region Sp2 is a second recording region and the adjacent reproducing beam P2 is a second reproducing beam, and like reference numerals are also given to both of them.

Herebelow, a method of processing optical information according to an embodiment of the present invention will be described in detail with reference to the accompanying drawings.

Figure 2:
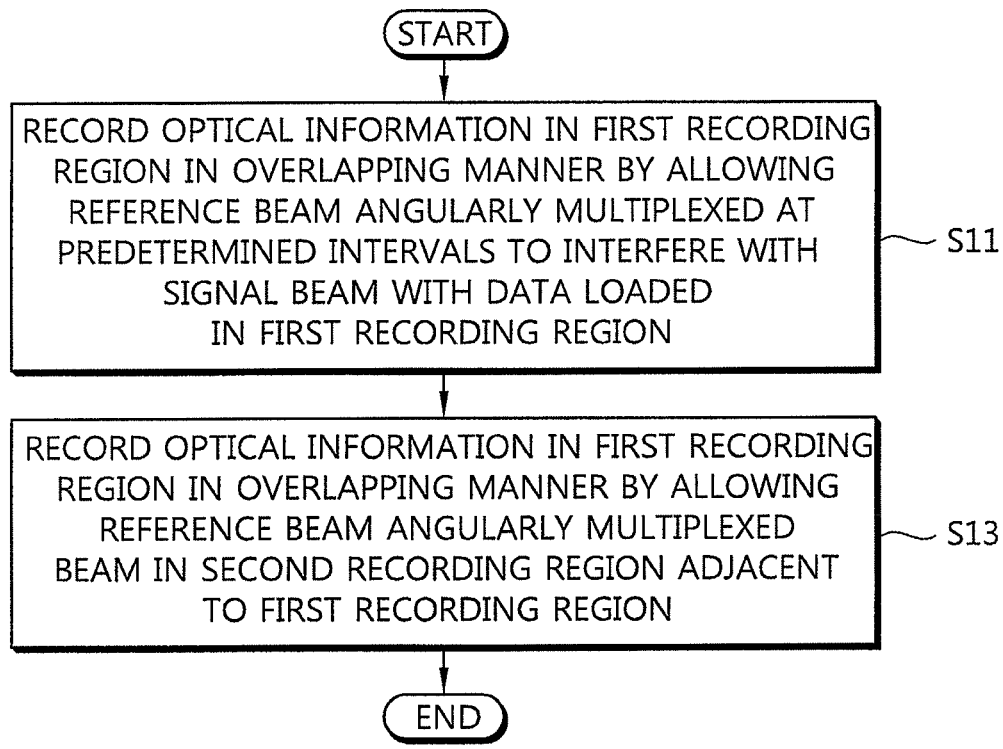
FIG. 2 is a flowchart illustrating a method of recording optical information according to an embodiment of the present invention.

FIG. 2 is a flowchart illustrating a method of recording optical information according to an embodiment of the present invention. Referring to FIGS. 1 and 2, the beam L is emitted from the light source 110 so as to record optical information. The beam L is split into the reference beam R and the signal beam S by the optical splitter 120.

The signal beam S is transmitted through the beam splitter 120, and the reference beam R is reflected by the beam splitter 120. The signal beam S transmitted through the beam splitter 120 progresses toward the optical modulator 140 after passing through the shutter 130. Data is loaded onto the signal beam S by the optical modulator 140, and the signal beam S with the data loaded is condensed onto the recording medium M by the objective lens 150.

The reference beam R reflected by the beam splitter 120 is angularly multiplexed by the angle multiplexer 160, and irradiated onto the recording medium M. The reference beam R and the signal beam S interfere with each other at the recording region Sp of the recording medium M to form interference fringes, and thus optical information is recorded.

In operation S11, the reference beam R is incident on the recording medium M at one of first multiplexing angles that is angularly multiplexed. and interferes with the signal beam S in the first recording region Sp1. Here, the fist multiplexing angles have predetermined intervals therebetween. Also, in operation S13, the reference beam R is incident on the recording medium M at one of second multiplexing angle that is angularly multiplexed and interferes with the signal beam S in the second recording region Sp2 adjacent to (or partially overlapped with) the first recording region Sp1. Here, the second multiplexing angles are different from the first multiplxing angles and also have predetermined intervals therebeween. And, preferably, the second multiplxing angles could be between the first multiplexing angles, respectively.

To facilitate the understanding, for example, the reference beam R irradiated onto the first recording region Sp1 may have the first multiplexing angles such as $1°, 2°, 3°, \ldots, n-1°$, and $n°$, and the reference beam R irradiated onto the second recording region Sp2 may have the second multiplexing angles such as $1.5°, 2.5°, 3.5°, \ldots, (n-1)+0.5°$, and $n+0.5°$.

As for the first and second multiplexing angles, each of the first and second multiplexing angles has an equal interval of $1°$. Furthermore, the first and second multiplexing angles do not overlap each other. And, preferably, the second multiplexing angles are median values of pairs of adjacent first multiplexing angles, respectively.

Hence, the reference beam R, which has the first and second multiplexing angles having an equal interval and not overlapping each other, interferes with the signal beam S in the first and second recording regions Sp1 and Sp2 to thereby form interference fringes.

That is, n number of bits of optical information can be recorded in each of the first and second recording regions Sp1 and Sp2 in an overlapping manner by irradiating the reference beam R having the first and second multiplexing angles onto the first and second recording regions Sp1 and Sp2, respectively.

Figure 3:
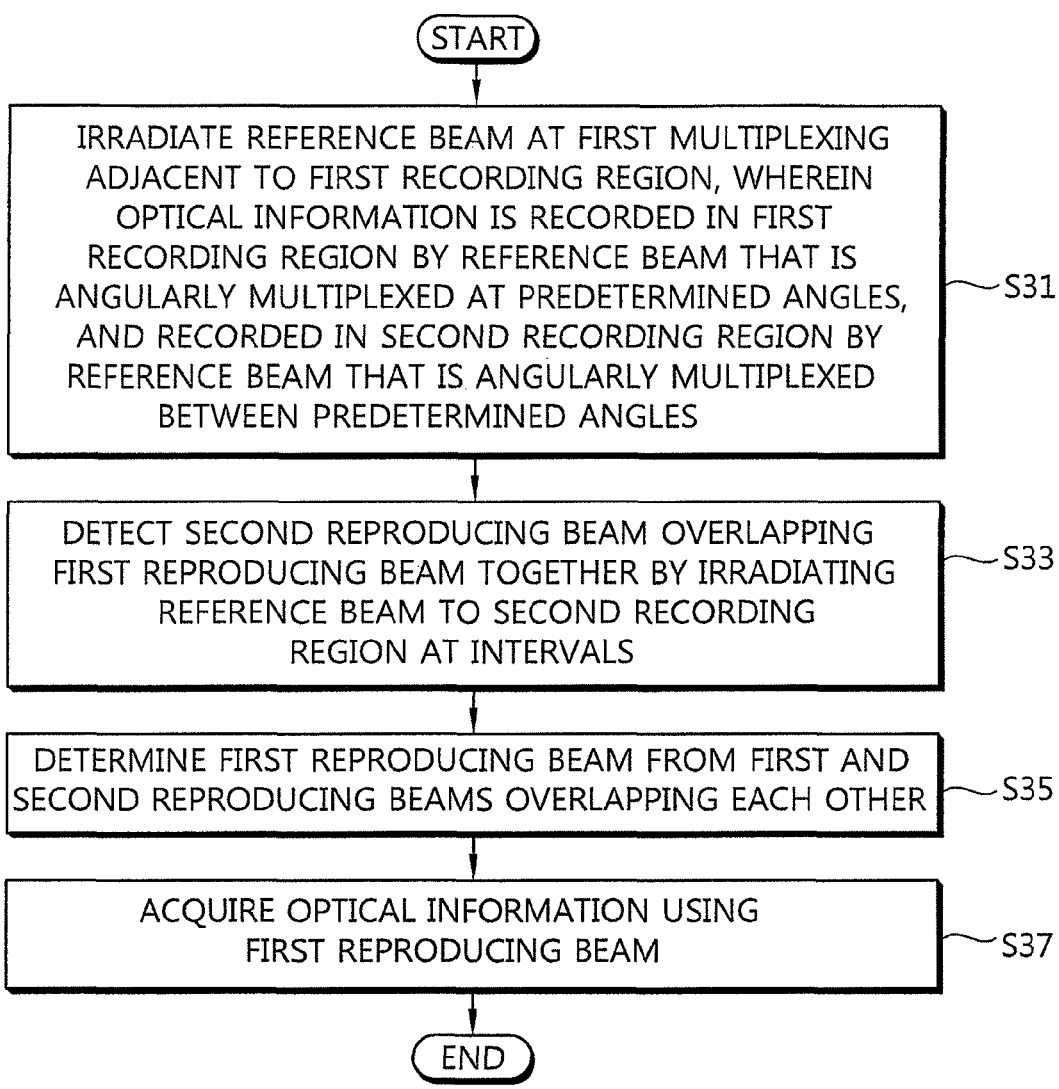
FIG. 3 is a flowchart illustrating a method of reading optical information according to an embodiment of the present invention.

FIG. 3 is a flowchart illustrating a method of reading optical information according to an embodiment of the present invention. Referring to FIGS. 1 and 3, the beam L is emitted from the light source 110 to read optical information. The beam L is split into the reference beam R and the signal beam S by the beam splitter 120.

The signal beam S is transmitted through the beam splitter 120, and the reference beam R is reflected by the beam splitter 120. The signal beam S transmitted through the beam splitter 120 is blocked by the shutter 130.

Meanwhile, the reference beam R reflected by the beam splitter 120 is angularly multiplexed by the angle multiplexer 160, and then incident on the recording medium M. At this time, in operation S31, the reference beam R is incident on the recording medium M at one of the first multiplexing angles, allowing the first reproducing beam P1 to be generated from the first recording region Sp1.

Herein, the reference beam R may be irradiated to the second recording region Sp2 according to the beam width of the reference beam R when the reference beam R is irradiated to the first recording region Sp1. Accordingly, the first reproducing beam P1 and the second reproducing beam P2 may be generated together in the first and second recording regions Sp1 and Sp2. The optical filter 180 blocks the second reproducing beam P2 progressing toward the optical detector 170, and allows only the first reproducing beam P1 to progress toward the optical detector 170. The second reproducing beam P2 passing through the optical filter 180 is detected by the optical detector 170.

Even though the optical filter 180 blocks the second reproducing beam P2, the first reproducing beam P1 and the second reproducing beam P2 are generated in front of the optical filter 180 in an overlapping manner. In this case, therefore, a mixed beam may progress toward the optical detector 170. Accordingly, in operation S33, the first reproducing beam P1 and the second reproducing beam P2 may be detected together by the optical detector 170.

Consequently, in operation S37, the first reproducing beam P1 is determined using intensities of the reproducing beams P1 and P2 detected by the optical detector 170. Therefore, in operation S37, optical information can be acquired.

To facilitate the understanding, following description will be made by comparing the intensities of the first and second reproducing beams P1 and P2 with each other depending on the reference beam R of the first multiplexing angle according to the aforesaid embodiment.

Figure 4:
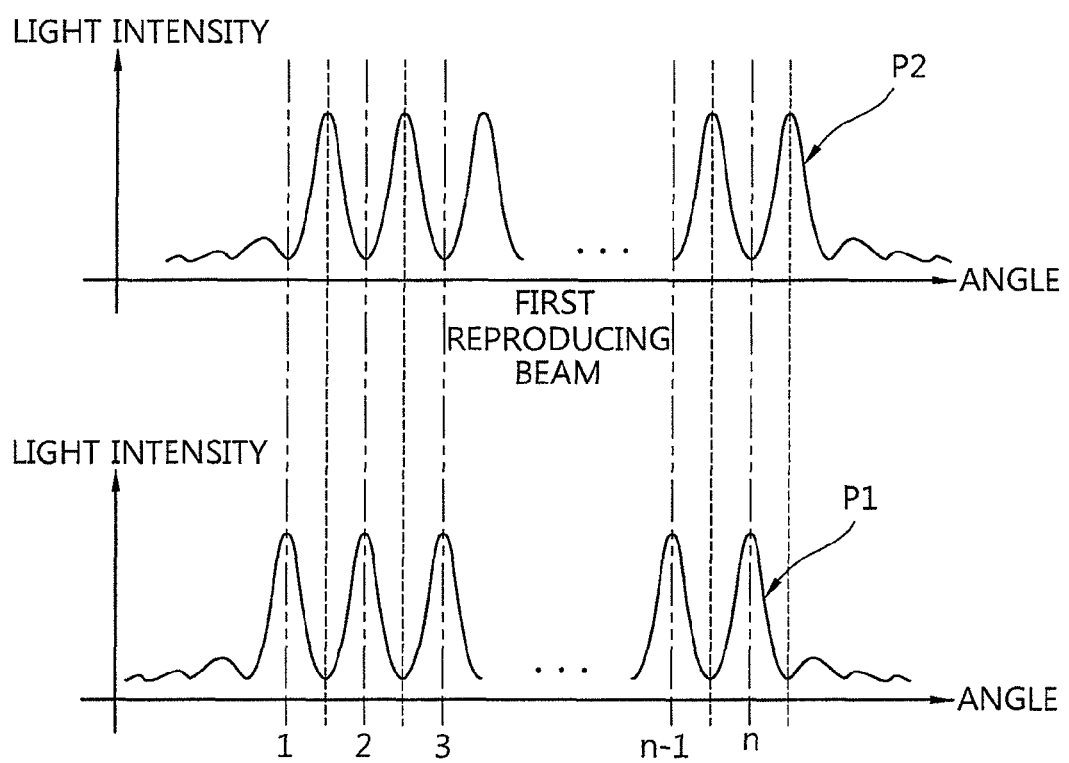
FIG. 4 is a graph showing intensities of detected reproducing beams that generated by irradiating a reference beam of a first multiplexing angle to recording regions where optical information is recorded through a method of processing the optical information according to an embodiment of the present invention.

FIG. 4 is a graph showing intensities of detected reproducing beams generated by irradiating the reference beam of the first multiplexing angle to recording regions where optical information is recorded through the method of processing the optical information according to an embodiment of the present invention. Referring to FIG. 4, the reference beam R having the first multiplexing angle such as 1°, 2°, 3°, ..., n−1°, and n° interferes with the signal beam S, as illustrated in the foregoing embodiment. Therefore, the reference beam R is irradiated to the first recording region Sp1, at an angle such as 1°, 2°, 3°, ..., n−1°, and n° so as to generate the first reproducing beam P1 in the first recording region Sp1.

The first reproducing beam P1 generated by irradiating the reference beam R having the first multiplexing angle to the first recording region Sp1 is detected by the optical detector 170, and has the highest light intensity at angle of 1°, 2°, 3°, ..., n−1°, and n°.

On the contrary, when the reference beam R having the first multiplexing angle is irradiated to the second recording region Sp2 where the reference beam R having the second multiplexing angle such as 1.5°, 2.5°, 3.5°, ..., (n−1)+0.5°, and n+0.5° interferes with the signal beam S, the second reproducing beam P2 detected by the optical detector 170 has the lowest light intensity at an angle of 1°, 2°, 3°, ..., n−1°, and n°.

Therefore, the reproducing beam having higher light intensity may be determined as the first reproducing beam P1 by comparing light intensities of the two reproducing beams P1 and P2 detected by the optical detector 170, thus acquiring optical information from the first reproducing beam P1.

So far, the description has been made assuming that the selected recording region Sp1 is the first recording region, and the selected reproducing beam P1 is the first reproducing beam. However, when the reference beam R is irradiated to the second recording region at the second multiplexing angle even assuming that the selected recording region Sp1 is the second recording region and the selected reproducing beam P1 is the second reproducing beam, operation and function are similar to the aforesaid case. Here, the first recording region may be the adjacent recording region Sp2, and the first reproducing beam may be the adjacent reproducing beam P2.

Consequently, the method of processing optical information according to the present invention makes it possible to easily determine the selected reproducing beam P1 from the adjacent reproducing beam P2 even though the selected reproducing beam P1 and the adjacent reproducing beam P2 are generated in an overlapping manner.

While the present invention has been particularly shown and described with reference to exemplary embodiments thereof, it will be understood by those of ordinary skill in the art that various changes in form and details may be made therein without departing from the spirit and scope of the present invention as defined by the following claims. Thus, it will be apparent to those having ordinary skill in the art that such changes and modifications fall within the protected scope of the present invention.

What is claimed is:

1. A method of reading optical information, the method comprising:

performing a first reference beam irradiation operation for irradiating a reference beam at one of first multiplexing angles to a first recording region, wherein optical information is recorded in the first recording region by the reference beam that is angularly multiplexed at the first multiplexing angles, and recorded in the second recording region by the reference beam that is angularly multiplexed to a second multiplexing angles which are between the first multiplexing angles, respectively, and wherein the second recording region is located adjacent to the first recording region or partially overlapped with the first recording region; and performing a first optical detection operation for detecting a first reproducing beam generated from the first recording region, wherein the first optical detection operation further performs detecting a second reproducing beam overlapping the first reproducing beam generated by irradiating the reference beam at the one of the first multiplexing angles to the second recording region, wherein the first optical detection operation further comprises a first optical determination operation for determining the first reproducing beam from the first and second reproducing beams overlapping each other, wherein the first optical determination operation comprises comparing light intensities of the first and second reproducing beams with each other, and determining the reproducing beam with a higher intensity between the first and second reproducing beams as the first reproducing beam, wherein the first optical detection operation further performs detecting a second reproducing beam overlapping the first reproducing beam generated by irradiating the reference beam at the one of the first multiplexing angles to the second recording region.

2. The method of claim 1, wherein the first optical detection operation further comprises a first optical determination operation for determining the first reproducing beam from the first and second reproducing beams overlapping each other.

3. The method of claim 2, wherein the first optical determination operation comprises comparing light intensities of the first and second reproducing beams with each other, and determining the reproducing beam with a higher intensity between the first and second reproducing beams as the first reproducing beam.

4. A method of reading optical information, the method comprising:
performing a first reference beam irradiation operation for irradiating a reference beam at one of first multiplexing angles to a first recording region, wherein optical information is recorded in the first recording region by the reference beam that is angularly multiplexed at the first multiplexing angles, and recorded in the second recording region by the reference beam that is angularly multiplexed to a second multiplexing angles which are between the first multiplexing angles, respectively, and wherein the second recording region is located adjacent to the first recording region or partially overlapped with the first recording region;
performing a first optical detection operation for detecting a first reproducing beam generated from the first recording region, wherein the first optical detection operation further performs detecting a second reproducing beam overlapping the first reproducing beam generated by irradiating the reference beam at the one of the first multiplexing angles to the second recording region, wherein the first optical detection operation further comprises a first optical determination operation for determining the first reproducing beam from the first and second reproducing beams overlapping each other, wherein the first optical determination operation comprises comparing light intensities of the first and second reproducing beams with each other, and determining the reproducing beam with a higher intensity between the first and second reproducing beams as the first reproducing beam; and
performing a second reference beam irradiation operation for irradiating the reference beam at one of the second multiplexing angles to the second recording region; and performing a second optical detection operation for detecting the second reproducing beam generated from the second recording region.

5. The method of claim 4, wherein the second optical detection operation further performs detecting a first reproducing beam overlapping the second reproducing beam generated by irradiating the reference beam at the one of the first multiplexing angles to the first recording region.

6. The method of claim 5, wherein the second optical detection operation further comprises a second optical determination operation for determining the second reproducing beam from the first and second reproducing beams overlapping each other.

7. The method of claim 6, wherein the second optical determination operation comprises comparing light intensities of the first and second reproducing beams with each other, and determining the reproducing beam with a higher intensity between the first and second reproducing beams as the second reproducing beam.

* * * * *